Aug. 24, 1954  L. L. STOTT  2,686,935
METHOD OF MOLDING ARTICLES FROM NYLON
Filed July 27, 1950  4 Sheets-Sheet 1

L. L. STOTT 2,686,935

METHOD OF MOLDING ARTICLES FROM NYLON

Filed July 27, 1950

INVENTOR
Louis L. Stott
BY
ATTORNEYS

Aug. 24, 1954  L. L. STOTT  2,686,935
METHOD OF MOLDING ARTICLES FROM NYLON
Filed July 27, 1950  4 Sheets-Sheet 3

INVENTOR
Louis L. Stott
BY
ATTORNEYS

Patented Aug. 24, 1954

2,686,935

UNITED STATES PATENT OFFICE 2,686,935

METHOD OF MOLDING ARTICLES FROM NYLON

Louis L. Stott, Reading, Pa., assignor to The Polymer Corporation, Reading, Pa., a corporation of Pennsylvania Application July 27, 1950, Serial No. 176,110

13 Claims. (Cl. 18—55)

This invention relates to the molding of articles from synthetic linear polyamides, especially the high melting polyamides such as polyhexamethylene adipamide and polyhexamethylene sebacamide, commonly known to the trade as nylon. The invention is particularly concerned with the molding of articles or pieces for industrial use, such as rod stock, slabs, etc., which may be used as such or from which other articles may be machined.

Various of the nylon materials, and especially the high melting nylons are rather readily subject to oxidation and degradation when at high temperatures. These materials, moreover, are also characterized by a relatively low coefficient of thermal conductivity, in view of which heating thereof to melt the material proceeds rather slowly. Moreover, in an effort to accelerate the rate of melting by increasing the heating temperature, localized overheating tends to occur with consequent aggravation of oxidation and/or degradation.

The materials in question also have relatively sharp melting points and, in the molten condition they have relatively low viscosity. Still further certain of these materials and notably the polyhexamethylene adipamide are characterized by high volumetric shrinkage on solidification.

Various of the foreging characteristics, and notably the low coefficient of thermal conductivity and the tendency to oxidize and/or degrade at high temperature, give rise to special problems in the handling of these materials for molding purposes, including problems which arise during both the heating and the molding steps.

Certain methods and equipment for molding such materials are disclosed in my Patent No. 2,505,807, issued May 2, 1950, and also in my copending applications, Serial Nos. 624,241, filed October 24, 1945, and issued January 9, 1951, as Patent No. 2,537,285, and 729,330, filed February 18, 1947, and issued October 9, 1951, as Patent No. 2,570,284, the latter disclosing a joint invention of myself and one Eugene E. Montross.

In general, it may be said that the present invention is concerned with improvements over the prior techniques, both with respect to method and equipment.

To point out certain of the objects and advantages of the present invention more specifically, attention is first called to the fact that as disclosed in my issued Patent No. 2,505,807 nylon in flake or granular form is packed into a mold and the charged mold is then subjected to heating in order to melt the charge, after which a pressure piston or plunger is advanced in one end of the mold and cooling is effected while the nylon is maintained under pressure. In this prior technique, therefore, the mold serves not only for molding purposes but also as a receptacle in which the nylon is melted.

In my copending application No. 624,241 the nylon in flake or granular form is packed into a cylindrical container and the charged container is then assembled with the mold tube and the assembly subjected to heating so as to melt the charge, after which the charge is delivered under pressure from the container into the mold.

Various features of the two arrangements briefly described just above have certain advantages and are suitable for certain molding purposes. For instance, they both provide for maintenance of the molten nylon under high pressure in the mold while the mold is being cooled. However, for a number of reasons, and especially where articles of substantial size or volume are being formed, I have found that it is advantageous to perform certain of the functions separately, rather than in the same equipment. More specifically, it is of special advantage to separate the operation of melting the nylon from the operations of molding and development of the molding pressure. The advantages in question are concerned both with equipment and method steps. On the one hand the kind of equipment best suited for the molding itself and for the development of the molding pressure is not best suited to the function of melting the nylon; and on the other hand equipment well adapted to the function of melting nylon is not best suited to the functions of molding operation.

Separation of various of the functions and performance of these functions in separate equipment, as above described, results in a number of advantages, an important one of which is a substantial decrease in certain adverse effects on the nylon and the articles formed therefrom. For example, surface discoloration of the articles formed is greatly diminished if not eliminated, according to the technique of the invention. Other advantages are mentioned as the following description proceeds.

With the foregoing in mind, the invention provides a method which may briefly be outlined as follows:

First, the flake or granular nylon is continuously fed in a column and the advancing column is subjected to heating so as to melt nylon and thereby produce a continuously flowing stream of molten nylon. A preheated intermediate cylindrical container is then charged from the molten stream of nylon and a mold is thereafter assembled with the charged container, with the mold cavity in communication with the cavity in the container and a pressure piston is advanced in the cylindrical container to deliver the molten charge from the container to the mold itself. The charge introduced into the container is of larger volume than the volume of the mold and the mold with the nylon therein is cooled while maintaining the pressure of the piston on the excess nylon in the container.

The use of the intermediate container as described above, including the preheating thereof and the charging thereof with molten nylon delivered in a stream is of great importance in enabling relatively rapid molding of pieces while at the same time avoiding conditions tending to oxidize or degrade the material, and this is especially true where the nylon is melted in a continuously advancing column of relatively small section, as is herein contemplated.

It may here be mentioned that for purposes of melting, I prefer to employ a heated screw device of the general type frequently employed for extruding various shapes from plastic materials, but it is to be noted that as here employed, the screw device is not utilized in the shaping of the article being formed, but only as a means for supplying a stream of molten nylon.

The intermediate container employed according to the invention is advantageously cylindrical and in each case an end wall of the cylinder constitutes, in effect, a pressure piston of relatively small axial dimension as compared with the length of the cylinder, and this cylinder and piston assembly is highly effective for the purpose of developing the molding pressure, which serves not only to deliver the molten material from the intermediate container but also to develop molding pressure in the associated mold. In this way articles of various shapes, even angular shapes, may readily be formed under high molding pressure (such as is needed for the formation of sound pieces of good physical properties) without the necessity of employing an angular piston working in an angular mold cavity.

A further advantage of the arrangement and method described lies in the fact that the intermediate container may be made of substantial diameter without encountering oxidation and degradation difficulties such as tend to arise where the melting heat is required to penetrate a substantial depth of material. The reason for this, of course, is that according to the invention the intermediate container is charged with premelted material, rather than relying upon the melting of the charge in the container itself. This feature is of especial importance where articles of substantial volume are to be molded. Moreover, the feature in question even enables the concurrent molding of a plurality of articles in a plurality of molds each of which has its mold cavity in communication with the cavity of a single container.

The invention also contemplates numerous other features of improvement in equipment and handling technique, which will be pointed out more fully as this description proceeds.

In the drawings, three illustrative embodiments of the invention are shown, these three each being of somewhat different type, but all utilizing the important general arrangement according to which an intermediate container is preheated and is charged with premelted nylon, the charge being thereafter delivered from the container into a mold brought into association therewith.

In considering the arrangement of Figure 1 to 4 inclusive, attention is first called to the fact that the general arrangement of mold tube, and container there shown is similar to that disclosed in my copending application Serial No. 624,241 above identified. The container comprises a tubular element 10 the interior surface of which is nicely finished, the tube being provided with a plug 11 at its lower end preferably made of a metal having a higher coefficient of expansion than that of the tube itself. For example, the tube may be made of steel and the plug of bronze; and with the plug and tube nicely fitted, the plug may readily be inserted when cold, but when the mold is heated the higher coefficient of expansion of the plug causes it to expand and tightly engage the interior wall of the tube. A plug 12 is inserted in the tube near the upper end thereof, and this plug is also advantageously formed of material of higher coefficient of expansion than that of the tube. This plug has a central aperture 13 which serves several purposes to be described. An important purpose to be mentioned is that of charging the container, but before considering this charging operation, brief reference is made to Figure 2 which illustrates the charging equipment.

Figures 1, 2:
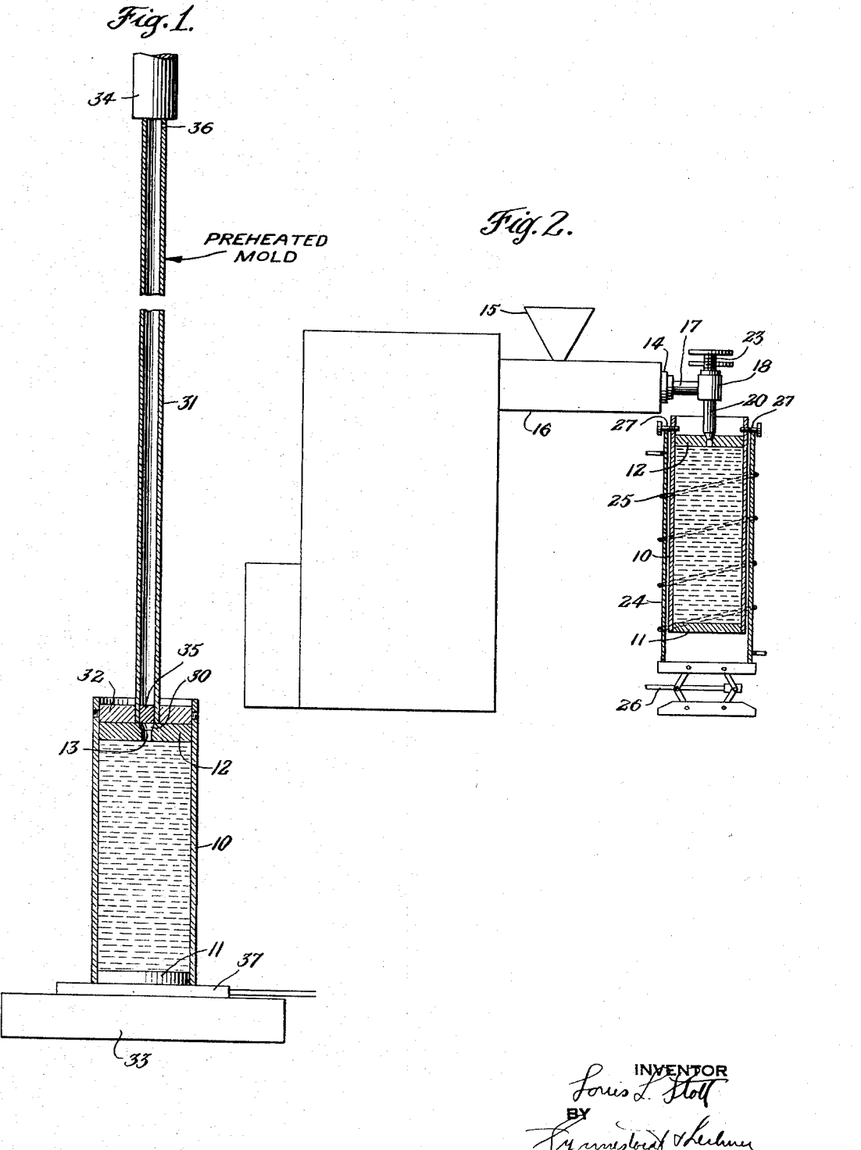
Figure 1 is an axial sectional view through an assembly of a container and a mold tube adapted to the production of an elongated rod.
Figure 2 is a view showing a nylon melting equipment according to the invention in outline, and further showing a container such as appears in Figure 1, associated with the melting equipment for charging purposes.
Figure 3:
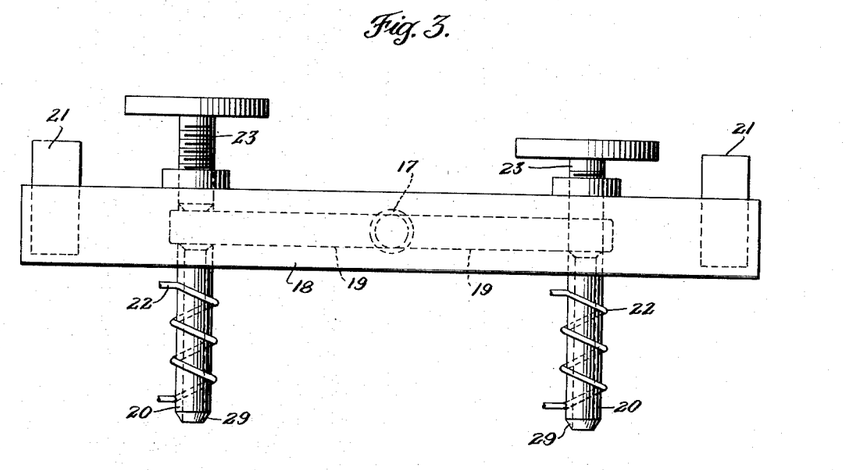
Figure 3 is an enlarged elevational view of a nozzle arrangement preferably associated with the nylon melting equipment.

Referring to Figure 2, a feed screw (not shown) is arranged within a tube or cylinder 14 and granular or flake nylon material is adapted to be fed to the screw through a funnel or feed hopper 15. The cylinder 14 of this device is surrounded by heater elements indicated in outline at 16 as a jacket surrounding the cylinder 14. This general arrangement of heated screw is not shown or described in detail herein since it may be of known type. The heating screw delivers a stream of molten nylon through the discharge pipe 17 which communicates with the multiple nozzle device which is best seen in Figure 3. This device comprises a bar 18 having passages 19—19 communicating with the pipe 17 and extended in each direction therefrom for communication with the delivery nozzles 20—20. The bar 18 is desirably equipped with heater elements 21—21 and in addition heater elements such as shown at 22—22 are advantageously applied to the nozzles 20 themselves. These several heater elements serve to keep the nylon at the molten temperature during the feeding thereof and the charging of containers brought to the melting equipment. Valves 23—23 serve to control the discharge of the molten nylon from one or the other of the nozzles 20—20, it being contemplated that the screw heater be operated continuously and that different containers be alternately charged from the two nozzles 20—20.

As seen in Figure 2 a heating chamber 24 is arranged below one of the nozzles 20, this chamber being provided with a heater element indicated at 25. The bottom of the chamber is supported by means of a jack device diagrammatically indicated at 26 by means of which the chamber may be raised and lowered with reference to the nozzle 20.

Figure 4:
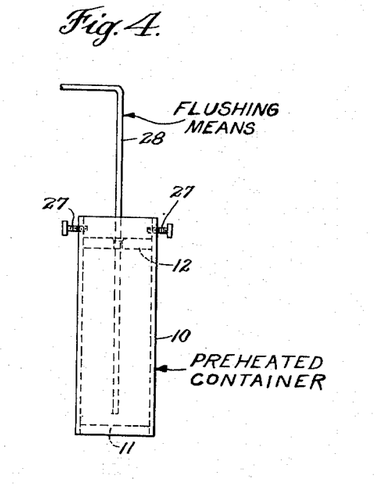
Figure 4 is an outline view illustrating another operation to be later described.

Returning again to the arrangement of the container, it will be noted from Figures 2 and 4 that a pair of screws 27—27 are threaded into apertures near the upper end of the container tube 10, these screws serving to support the container from the upper edge of the heating chamber 24 in position for association with one of the filling nozzles 20.

In the use of the equipment described above, it is now noted that the container with the plugs 11 and 12 inserted therein is first preheated to a temperature above the melting point of the nylon being used. In an illustrative example, employing polyhexamethylene adipamide (melting point about 507° F. and freezing point about 473° F.) the container should be preheated to a temperature from about 515° F. to about 550° F., preferably between about 520° F. and 535° F. The preheated container is then flushed with an inert gas, for instance nitrogen or carbon dioxide, by the insertion of a tube, shown at 28 in Figure 4, through the aperture 13 in the plug 12. Space around the tube 28 provides for escape of air during the flushing. The preheated and flushed container is then placed in the heating chamber 24 and jacked up as shown in Figure 2 until the tapered end 29 of one of the nozzles 20 seats in the flared end 30 of the aperture 13, thereby substantially closing the container, except for its communication with the nozzle 20.

It is to be understood, of course, that prior to this assembly of the container with the nozzle 20, the heated screw device for melting the nylon has already been placed in operation, so that (with the appropriate valve 23 opened) filling of the container immediately commences. It may here also be mentioned that the gas in the interior of the container may leak past the nozzle and/or the plug 12 during the filling operation. At this time the container is in effect substantially liquid tight but is not closed so tight as to preclude the escape of gases. In the case of polyhexamethylene adipamide, the stream of molten nylon delivered to the container should be at a temperature somewhat above the melting point of the nylon, for instance from about 505° F. to about 535° F., preferably from about 520° F. to 535° F.

During the filling operation, sufficient heat is supplied to the container to avoid appreciable drop in temperature thereof, by the heater element 25.

After the charging operation the jack 26 may be lowered and the charged container removed from the heating chamber. Screws 27 may also be taken out and the charged container is then promptly assembled with a mold such as the mold tube indicated at 31 in Figure 1. It will be noted that this mold tube has a plunger or plug 32 fixed to its lower end and adapted to seat within the container cylinder 10. The mold tube 31 has its lower end in registry with the aperture 13 through the plug 12 and this entire assembly is placed between the bed and plunger of a hydraulic press, such bed being diagrammatically indicated at 33 and the plunger at 34, whereupon the press is actuated to drive the plunger downwardly, thereby forcing the plugs 32 and 12 downwardly in the tube 12 to deliver the molten charge under pressure into the lower end of the mold tube 31.

It is preferred, especially in the case of mold tubes of substantial diameter and/or length to preheat the mold tube prior to assembly with the charged container. In the case of polyhexamethylene adipamide, such preheating is advantageously carried to a temperature between about 350° F. and about 450° F., preferably from about 400° F. to 425° F. A slidable plug 35 made of material having a higher coefficient of expansion than that of the mold tube may also be inserted at the lower end of the mold tube 31 prior to the molding operation, this plug serving to displace the air out of the mold tube in advance of the incoming charge. The air may leak past the plunger 34 at the upper end of the mold tube or may escape through a vent hole 36.

The volume of the charge introduced into the container 10 is preferably somewhat greater than the volume of the mold, and this excess acts somewhat as a feeder head during cooling and solidification of the article being formed in the mold tube. By providing this excess, the pressure of the plug 12 thereon may be utilized to maintain the material in the mold tube under the desired high pressure during the cooling operation. In order to assure that this condition may be maintained during cooling of the mold, a heater element such as shown at 37 may be located intermediate the lower end of the container and the press bed 33. This heater may be used to retain the excess material in the container in molten condition at least during the actual solidification of the piece in the mold tube.

The molding pressure is maintained during cooling of the mold tube and the piece being formed therein until the temperature thereof drops well below the solidification point, which in the case of polyhexamethylene adipamide is about 473° F.

As an alternative, it may be mentioned in connection with the above description of Figure 1 to 4 inclusive, that after filling of the container in the manner described with reference to Figure 2, the upper plug 12 may be removed, in which case the plug 32 which is attached to the mold tube 31 may serve alone as the pressure piston acting on the molten material in the container. It is of advantage, however, to exclude air from contact with the molten material as much as possible, and this is better achieved by leaving the plug 12 in place.

Figure 5:
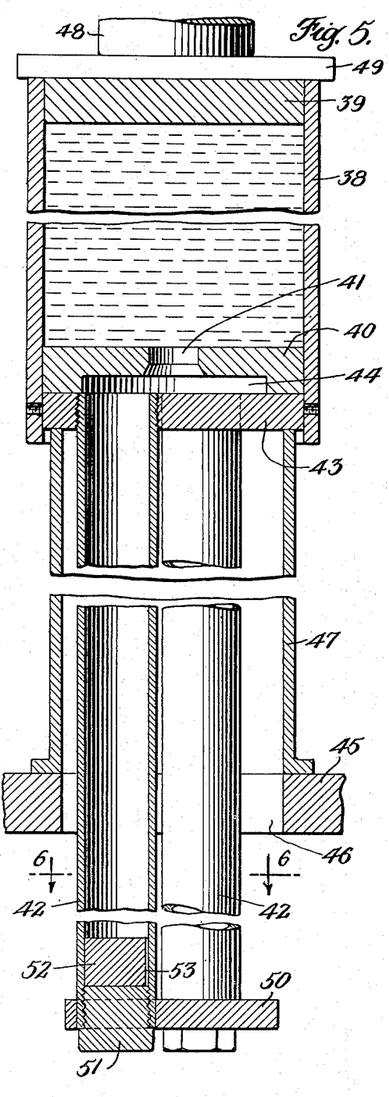
Figure 5 shows a second form of equipment and is an axial sectional view through a container charged with molten nylon, with the container associated with a plurality of molds.
Figure 6:
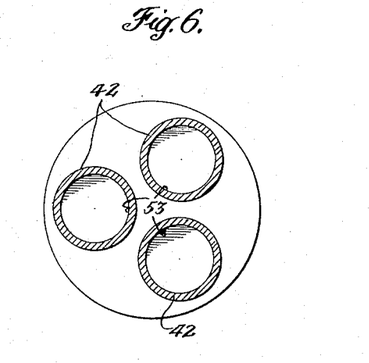
Figure 6 is a transverse sectional view taken as indicated by the section line 6—6 on Figure 5.
Figure 7:
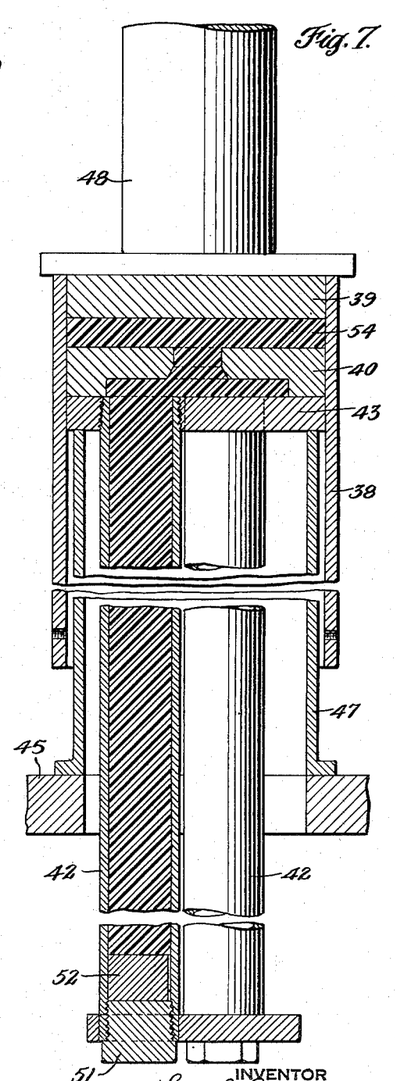
Figure 7 is a view similar to Figure 5 but showing the parts in a different position.

Turning now to the arrangement of Figures 5 to 7 inclusive, it is first noted that as far as the arrangement of the container is concerned and the mounting thereof in the press, this embodiment is similar to that disclosed in the copending application Serial No. 729,330 above identified.

As in the first embodiment the container comprises a cylindrical member 38 one end of which is closed by a plug 39 and the other end of which has a plug 40 therein, both of the plugs having a higher coefficient of expansion than the tube for tightness of fit. The plug 40 has a central aperture 41 which is utilized in the manner described above for flushing the container and for filling the container by bringing it into association with a nozzle 20 of the filling equipment. At this time it will be understood that the container is inverted in position as compared with that shown in Figures 5 and 7.

After the preheating, flushing and filling steps as described above, the container 38 is assembled with one or a group of mold tubes such as shown at 42, three being here illustrated. Each of these tubes is inserted at one end into an aperture of a plug 43 adapted to fit within the cylindrical container 38 in the manner of plug 32 of Figure 1. The outer face of the plug 40 is cut out as indicated at 44 to provide for distribution of the charge being delivered from the container into the several mold tubes. In the case of the arrangement of Figures 5 to 7, the bed structure of the press, indicated at 45, is provided with an aperture 46 through which the mold tubes may extend downwardly, and a sleeve 47 surrounding the nest or bundle of tubes 42 is supported on the press bed 45, with its upper end in engagement with the outer face of the plug 43. The press plunger 48 is adapted to bear against the upper end of the inverted container 38 through a plate 49, and in this way pressure is applied to the molten material in the container by advancing the plugs 40 and 43.

The lower ends of the tubes 42 may be interconnected for proper positioning and bracing by means of a plate 50 and in the case of each tube a closure plug 51 is provided at its lower end. If desired an additional plug 52 may be inserted in each tube just above the bottom plug 51, the plug 52 being axially scored or grooved as at 53 (see also Figure 6) to provide a leakage port for venting of air ahead of the nylon being forced downwardly into the tubes. As an alternative, a plug such as indicated at 52 may initially be placed at the entrance end of each mold tube, this plug being slidable in the mold tube and being driven downwardly therein under the influence of the molten nylon material entering the mold tube from the container.

The molding operation results in telescoping of the parts in the manner illustrated in Figure 7.

Here again it will be noted that the container is to be filled with an excess of nylon which, as shown at 54 in Figure 7, serves for the development of pressure in the mold tubes themselves.

The various operational steps fully described in connection with the embodiment of Figures 1 to 4 are also preferably utilized in handling the equipment of Figures 5 to 7, including the preheating, flushing and filling of the container, the preheating of the mold tubes, the development of pressure, and the cooling below the solidification point, while maintaining the material under pressure.

From the foregoing it will be observed that Figures 5, 6 and 7 illustrate the molding of a plurality of pieces concurrently from material delivered from a single intermediate container. This same type of equipment may also be utilized in molding only one rod at a time.

In the molding of articles such as rods with the equipment illustrated in any of Figures 1 to 7 inclusive, it is desirable to utilize relatively high molding pressure. The equipment of Figures 5, 6 and 7 is especially advantageous in that it may be utilized to carry even higher pressures than the equipment of the first form, especially where rods of considerable length are being molded. In the case of equipment of the kind illustrated in Figures 5, 6 and 7 the molding pressure is desirably upwards of 8,000 lbs. per square inch, an appropriate range being about 15,000 to about 30,000 lbs. per square inch. Pieces of very considerable volume may readily be molded according to the present invention, especially when using the form of equipment shown in Figures 5, 6 and 7. Thus, for example, several rods of as much as ½" in diameter and up to 10' to 12' in length may readily be molded, while maintaining the nylon material under the most favorable conditions from the standpoint of oxidation and degradation. This latter is achieved in part by virtue of the use of the heated screw for melting the nylon, such a heated screw being capable of quickly melting a column of the nylon of relatively small cross sectional dimension and of delivering a continuous stream of melted nylon with virtually no prior contact with air. The preheating and flushing of the container and the manner of assembly thereof with the charging equipment and subsequently with the mold also serve to minimize contact with air while the nylon is at the molten temperature.

Figures 8, 9, 10:
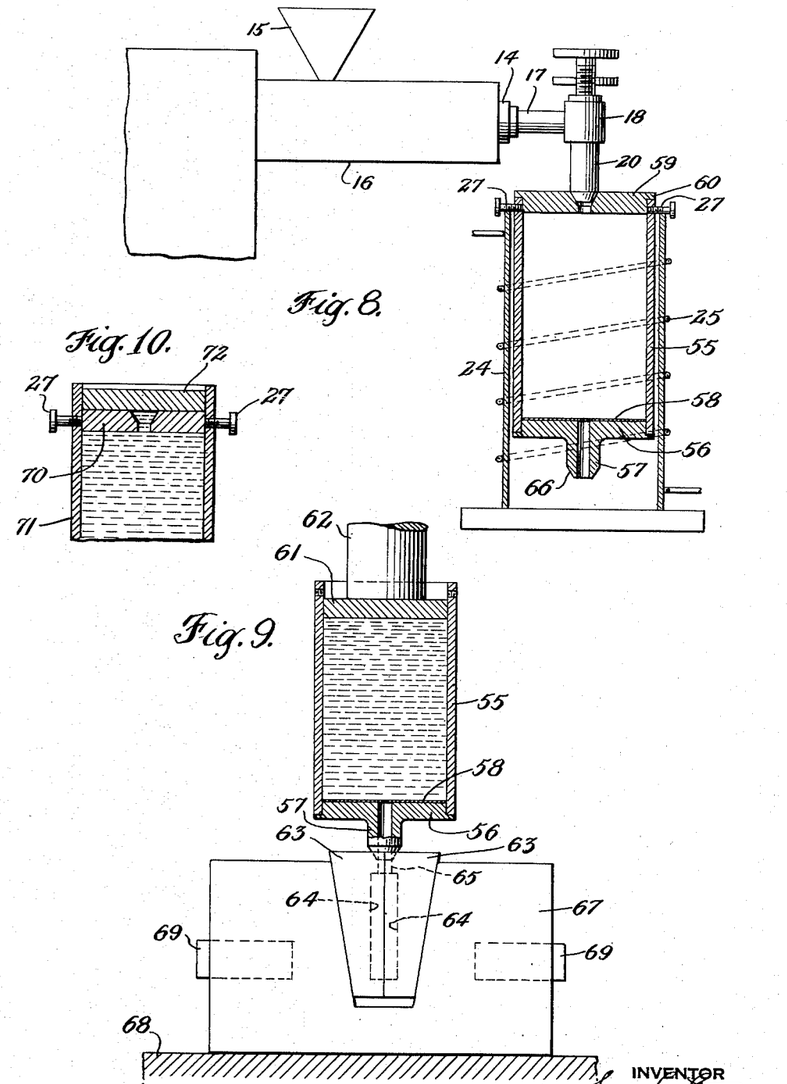
Figure 8 is a view illustrating the loading of still another type of intermediate container.
Figure 9 is a view of the charged container of Figure 8 associated with a mold.
Figure 10 is a fragmentary view similar to certain portions of Figures 8 and 9 but illustrating a modified arrangement.

Turning now to the embodiment of Figures 8 and 9, note first that the melting equipment there shown is the same as that described above in connection with Figure 2. In addition the same type of heating chamber 24 is also here utilized. However, the container illustrated in Figures 8 and 9 is somewhat different from those described above. This container comprises a cylindrical tube 55 having at its lower end a flanged plug 56 formed with a discharge nozzle 57. The passage through the nozzle 57 is temporarily closed by a diaphragm 58. At its upper end the container 55 has a plug 59 having a portion fitting within the cylinder 55 and also an annular flange 60 adapted to rest against the upper end of the cylindrical container. Screws 27 may here be employed in the manner already described to support the container in the heating chamber 24.

The plug 59 is apertured to provide for flushing with an inert gas and also to provide for filling by association with a nozzle 20. In using the arrangement here described it is contemplated that after filling, the plug 59 be removed and an imperforate plug such as shown at 61 inserted, the plug 61 serving as the pressure piston when the press plunger 62 is brought into engagement therewith.

The plug 56 is again formed of material having a higher coefficient of expansion than that of the tube, to provide for tightness of fit and this is also true of plug 61; and in the preferred use of the equipment of Figures 8 and 9, the plug 61 is inserted while at a relatively low temperature as compared with the charged container, so it may readily drop in place. Upon heating and expansion thereof it will, of course, snugly fit the interior wall of the container tube 55 and thereby properly perform its function as a pressure piston during the molding operation.

In Figure 9 there is illustrated a mold structure for the molding of a slab. The mold comprises a pair of elongated bars 63—63 (these being viewed from one end in Figure 9), one or both of the bars having a cavity formed therein as indicated at 64 and further having at the upper edge a port 65, advantageously positioned intermediate the ends of the bar 63. The entrance of the port 65 may be flared so as to mate with the tapered portion 66 of the nozzle 57. The outer surfaces of the bars 63—63 are inclined so as to fit the tapered cavity formed in the V-block diagrammatically indicated at 67, this block being mounted on the press bed 68. When the mold is assembled in the manner illustrated in Figure 9 and the charged container 55 brought into cooperation therewith, the pressure applied by the press plunger 62 serves to maintain tight engagement of the nozzle 57 with the entrance port of the mold and this pressure also urges the two mold bars 63—63 downwardly into the cavity of the V-block and thereby serves to maintain the two mold bars in tight interengagement so as to tightly close mold cavity 64.

Heater devices, such as the electrical heater elements 69, are associated with the block 67.

In the operation of the equipment shown in Figures 8 and 9 it will be understood that the steps of preheating the container, flushing the container, charging the container, etc., are all followed out in the general manner described above with reference to Figure 4. Here also it is contemplated that a charge be introduced into the container 55 somewhat in excess of the volume of the mold cavity so that the pressure of the plunger 61 against this excess material may retain proper pressure within the mold cavity during the cooling of the mold and the consequent solidification of the piece being formed.

In using the equipment of Figure 9 in the molding of slabs of polyhexamethylene adipamide, it is contemplated that the heater elements be operated to retain the V-block 67 at an elevated temperature, such as to effect heating of the mold itself to a temperature in the range from about 350° F. to about 450° F. It is preferred in slab molding to avoid too high a mold temperature and usually the mold temperature should be kept below about 410° F., most advantageously in the range of 380° F. to about 400° F. After actuation of the press plunger 62 to deliver the molten charge to the container 55 into the slab mold, the pressure is maintained until solidification of the slab in the mold occurs, after which the container may be removed and the mold taken out, opened and the molded slab removed. The mold pieces may then be reassembled and returned to the V-block for the molding of a subsequent slab. Upon returning the mold to the V-block the temperature will again be brought back to the desired molding temperature, and when this temperature is again attained another charged container can then be brought into association with the mold to form another slab.

Still further in connection with Figures 8 and 9 it should be mentioned that the diaphragm 58 preferably constitutes a thin metal diaphragm which is readily rupturable under the influence of the pressure built up by advancing the plug 61 under the press plunger 62. This diaphragm is, of course, discarded after each operation and a new one inserted before the subsequent refilling of the container.

In Figure 10 there is illustrated a modification of the arrangement shown in Figures 8 and 9, according to which an apertured plug 70 is supported toward the upper end of the container 71 by means of the screws 27, which screws may also serve the function of supporting the container during charging as illustrated in Figure 8. After charging the container of Figure 10 another plug 72 may be inserted above the plug 70, the plug 72 being imperforate. When this arrangement is brought into position to deliver a molten charge to a mold, the screws 27 may be loosened and the press plunger 62 brought downwardly against the imperforate plug 72.

The invention contemplates that such a diaphragm may be utilized in any arrangement in which the intermediate container has a discharge port associated with an end plug thereof and where the discharge port would otherwise be open during the charging operation.

Hereinabove reference has been made for purposes of illustration to the use of polyhexamethylene adipamide in the molding of various articles and typical temperatures of preheat and melting of the material have also been given for the adipamide. In the event of employment of polyhexamethylene sebacamide (melting point 450° F.) the temperature of preheat of the container is advantageously from about 460° F., to about 500° F., and the temperature of preheat of the mold (either a rod mold or a slab mold) may be from about 290° F. to about 330° F. In the case of the sebacamide, moreover, the screw heater should be adjusted to melt and heat the nylon to a temperature somewhat above the melting point thereof, for instance in the range of from about 475° F. to about 490° F.

I claim:

1. A method for molding an article from nylon, comprising preheating a mold, preheating a cylindrical container to a temperature above the melting point of the nylon, delivering a charge of molten nylon into the preheated container, the volume of the charge being greater than that of the mold, assembling the preheated and charged container with the preheated mold with the entrance port of the mold in communication with the charged container cavity, while the container and its charge are at a temperature above the melting point of the nylon advancing a pressure piston in the container to deliver molten nylon under pressure therefrom into the mold, and cooling the mold and the container and the nylon in both to a temperature below the solidification point of the nylon while continuing to exert pressure by means of said pressure piston on the excess nylon in the container to thereby effect solidification of the article being formed under pressure and also to effect solidification of the nylon in the container.

2. A method according to claim 1 in which a plurality of molds are used and charged from a single container and in which the charge delivered to the container is of greater volume than the combined volume of the molds to thereby provide for the concurrent pressure molding of a plurality of articles as a result of the pressure applied to the excess of nylon charged into the container.

3. A method according to claim 1 in which the container is charged with molten nylon through a charging port and in which molten nylon is delivered from the container into the mold through said port.

4. A method according to claim 1 in which the container is charged with molten nylon through a charging port toward one end thereof and in which molten nylon is delivered from the container to the mold through a discharge port toward the other end of the container.

5. A method according to claim 1 in which the container is charged by delivering a stream of molten nylon into the container and in which heat is supplied to the preheated container during the charging period.

6. A method for molding an article from nylon, comprising preheating to a temperature above the melting point of the nylon a cylindrical container, flushing the preheated container with an inert gas, delivering a charge of molten nylon into the preheated and flushed container, assembling the charged container with a mold with the mold cavity in communication with the container cavity, the volume of the charge delivered into the container being greater than that of the mold cavity, while the container and its charge are at a temperature above the melting point of the nylon advancing a pressure piston in the container to deliver molten nylon under pressure therefrom into the mold, and cooling the mold and the container and the nylon in both to a temperature below the solidification point of the nylon while continuing to exert pressure by means of said pressure piston on the excess nylon in the container to thereby effect solidification of the article being formed under pressure.

7. A method for molding articles from nylon, comprising preheating a mold, preheating to a temperature above the melting point of the nylon a cylindrical container closed except for a charging port, flushing the preheated container with an inert gas introduced through said port, delivering a charge of molten nylon into the container through said port, assembling the charged container with the preheated mold with the mold cavity in communication with the container cavity, and with the container and mold both closed except for the intercommunication thereof applying pressure to the molten nylon by advancing a pressure piston in the container to deliver molten nylon under pressure from the container into the mold, the volume of the charge in the container being in excess of the volume of the mold cavity, and cooling the mold and the container and the nylon in both to a temperature below the solidification point of the nylon while continuing to exert pressure by means of said pressure piston on the excess nylon in the container to thereby effect solidification of the article being formed under pressure.

8. A method for molding articles from nylon, comprising preheating a mold, preheating to a temperature above the melting point of the nylon; a cylindrical container having end plugs one of which has a discharge port for cooperation with the inlet port of the mold and the other of which constitutes a temporary plug having a charging port therein, delivering a charge of molten nylon into the container through said charging port, removing said temporary plug and replacing it with an imperforate plug, while the discharge port of the container is associated with the inlet port of the mold and while the container and its charge are at a temperature above the melting point of the nylon applying pressure to the molten nylon in the container by relatively moving said imperforate plug and the plug having the discharge port toward each other to thereby deliver molten nylon from the container into the mold, the volume of the charge in the container being in excess of the volume of the mold cavity, and cooling the mold and the container and the nylon in both to a temperature below the solidification point of the nylon while continuing to exert pressure on the excess nylon in the container by means of said plugs to thereby effect solidification of the article being formed under pressure.

9. A method according to claim 8 in which the imperforate plug is inserted into the heated container while said plug is at an appreciably lower temperature to thereby provide for tightening of the plug in the container by virtue of thermal expansion thereof.

10. A method for molding an article from nylon, comprising preheating a mold having an inlet port, preheating to a temperature above the melting point of the nylon a cylindrical container having end plugs one of which has a port therethrough and the other of which is imperforate, delivering a charge of molten nylon into the container through said port, bringing the preheated mold and preheated and charged container together with the port of the container plug in communication with the inlet port of the mold, and applying pressure to the molten nylon in the container by relatively moving its end plugs toward each other to thereby deliver molten nylon from the container into the mold, the volume of the charge in the container being in excess of the volume of the mold cavity, and cooling the mold and the container and the nylon in both to a temperature below the solidification point of the nylon while continuing to exert pressure on the excess nylon in the container by means of said plugs to thereby effect solidification of the article being formed under pressure.

11. A method for molding articles from nylon, comprising preheating a mold preheating to a temperature above the melting point of the nylon a cylindrical container having an end plug with a port therein, delivering a charge of molten nylon into the container through said port, removing said ported plug and replacing it with an imperforate plug adapted to slide in the container as a piston, associating the charged container with a mold with the mold cavity in communication with the container cavity, while the container and its charge are at a temperature above the melting point of the nylon applying pressure to the nylon in the container by advancing said imperforate plug into the container to thereby deliver molten nylon under pressure from the container into the mold, the volume of the charge in the container being in excess of the volume of the mold cavity, and cooling the mold and the container and the nylon in both to a temperature below the solidification point of the nylon while continuing to exert pressure by means of said imperforate plug on the excess nylon in the container to thereby effect solidification of the article being formed under pressure.

12. A method for molding articles from nylon, which method comprises preheating a container comprising a cylinder and a piston to a temperature above the melting point of the nylon, delivering a charge of molten nylon into the container, preheating a plurality of pressure molds, associating the entrance port of each of the molds with the charged cavity of the container, the container being of greater volume than the combined volume of the molds to provide a feeder head of molten nylon, advancing the piston in the container to deliver molten nylon under pressure from the container into the molds, and cooling the molds and their individual charges and also the container and said feeder head below the solidification point of the nylon while maintaining said feeder head and thus the individual charges in the molds under pressure.

13. A method for molding articles from nylon, comprising charging molten nylon into a cylindrical container having a removable end plug provided with a plurality of ports, assembling the charged container with a plurality of mold tubes with the container cavity in communication with the mold cavities by means of said ports, the volume of the charge in the container being greater than the combined volume of the mold cavities, advancing a pressure piston in the container to deliver molten nylon under pressure therefrom into the mold tubes, and cooling the mold tubes and the container and the nylon therein to a temperature below the solidification point of the nylon while maintaining pressure on the excess nylon in the container to thereby effect solidification of the articles being formed under pressure and also to effect solidification of the nylon in the container.

References Cited in the file of this patent

UNITED STATES PATENTS

| Number | Name | Date |
|---|---|---|
| 2,287,277 | Ryder | June 23, 1942 |
| 2,305,362 | Taylor | Dec. 15, 1942 |
| 2,309,729 | Gordon | Feb. 2, 1943 |
| 2,327,079 | Wacker | Aug. 17, 1943 |
| 2,338,607 | Wacker | Jan. 4, 1944 |
| 2,423,914 | Wacker | July 15, 1947 |
| 2,467,107 | Bailey | Apr. 12, 1949 |
| 2,535,436 | Maynard | Dec. 26, 1950 |
| 2,537,285 | Stott | Jan. 9, 1951 |
| 2,570,284 | Stott et al. | Oct. 9, 1951 |